Dec. 15, 1970  P. H. EVANS  3,548,229
LONGITUDINALLY SPLIT HOUSING FOR ROTARY ELECTRIC MOTOR STATOR
Filed Jan. 21, 1969  2 Sheets-Sheet 1
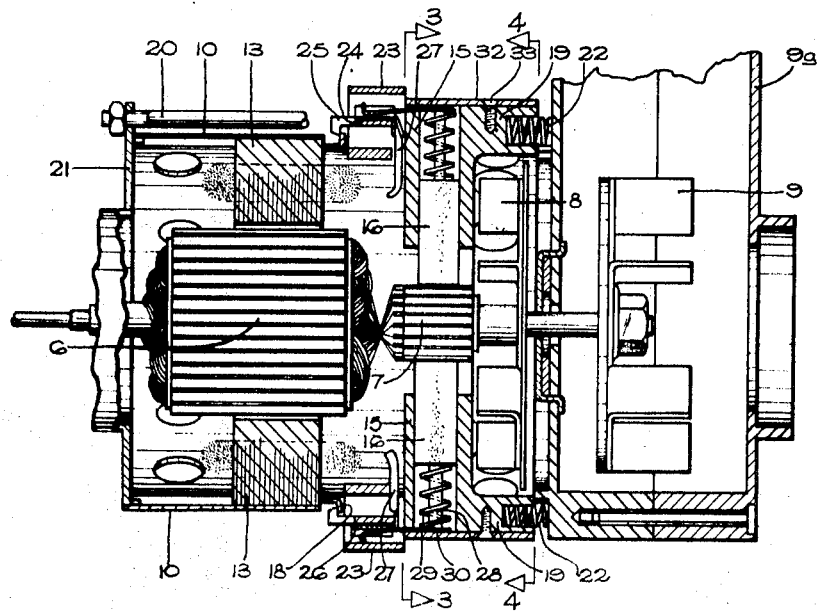
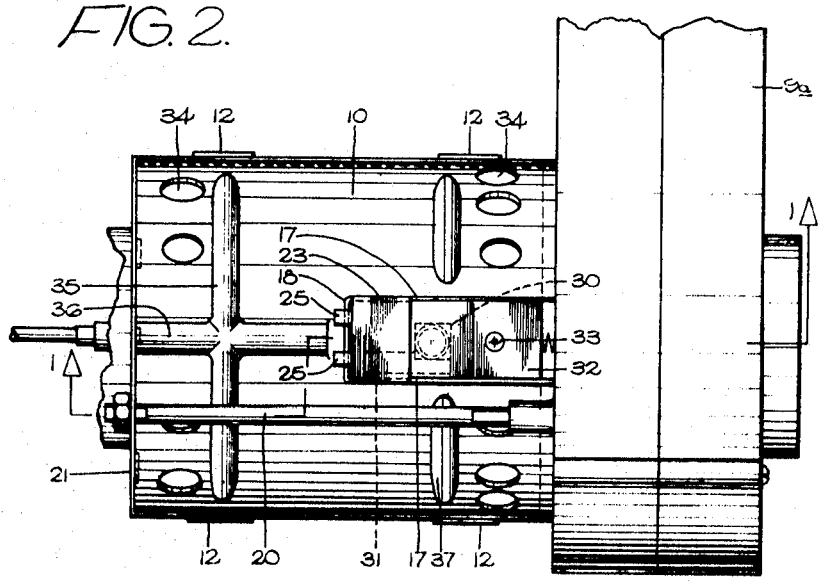
INVENTOR
PHILIP H. EVANS
By
AGENT

INVENTOR
PHILIP H. EVANS

United States Patent Office

3,548,229
Patented Dec. 15, 1970

---

3,548,229
LONGITUDINALLY SPLIT HOUSING FOR ROTARY ELECTRIC MOTOR STATOR
Philip H. Evans, Wollaston, Stourbridge, England, assignor to BSR Limited, Cradley Heath, Warley, England, a British company
Filed Jan. 21, 1969, Ser. No. 792,865
Claims priority, application Great Britain, Jan. 27, 1968, 4,364/68
Int. Cl. H02k 5/04
U.S. Cl. 310—89     4 Claims

ABSTRACT OF THE DISCLOSURE

A casing for an electric motor, made in two identical halves each of which is of substantially semi-cylindrical form having along one edge, which is parallel to the axis, two slots and two lugs on the opposite edge projecting outwardly in the radial direction, the casing being formed by assembling together the two halves and engaging the lugs of one half in the slots of the other half and vice versa. Each half of the casing also has strengthening ribs extending circumferentially and axially, the latter being used also to locate the stator core by engaging corresponding mating formations on the stator core.

BACKGROUND OF THE INVENTION

This invention relates to cylindrical casings for electrical equipment such as motors, generators, alternators, and the like, all hereinafter being referred to under the generic term "electrical equipment" and the invention is primarily concerned with such electrical equipment of relatively small form such as, is used in domestic apparatus, for example, vacuum cleaners, refrigerators, washing machines, food mixers, and the like, or in automobiles.

DESCRIPTION OF THE PRIOR ART

Hitherto, the general practice in the manufacture of such casings has been to make the casing from a single blank of metal sheet which is formed up to cylindrical form and then has its mating edges welded together and this operation is somewhat costly and complicated as it involves jigging and other tooling to get the casing to an absolutely true cylindrical form in order that it can properly accommodate the cylindrical form of stator or the like of the electrical equipment which is to be housed within the casing.

The object of the invention is to provide an improved and simplified form of casing for such electrical equipment which will considerably decrease the cost of manufacture of such casings and also provide for a rapid and easy assembly of the casing and its internal contents not requiring highly skilled labour.

SUMMARY OF THE INVENTION

According to the invention, I provide a casing for electrical equipment which is made in two halves, each of which has substantially semi-cylindrical form. Each half has at least one slot on one straight edge and an equal number of lugs on the opposite edge, each lug projecting outwardly, substantially in the radial direction in relation to the semi-cylindrical form. The casing is assembled by bringing the two halves together and engaging the lug or lugs of one in the slot or slots of the other, and vice versa.

By virtue of the lug and slot connection between the two parts, such casing when assembled is not of a rigid nature, and is not truly and accurately cylindrical but providing that the dimension of the two halves is chosen such that the internal dimension is no greater than the external dimensions of the stator part of the electrical equipment to be housed therein, then when such stator part which is itself of true cylindrical form is inserted within the casing, it will act to force the two halves of the casing into a rigid connected relationship and also into a substantially true cylindrical form.

BRIEF DESCRIPTION OF THE DRAWINGS

The invention is illustrated in the accompanying drawings wherein:
FIG. 1 is a section on the line 1—1 of FIG. 2.
FIG. 2 is a plan view of an assembled casing also showing assembled therein a brush holder unit.

DESCRIPTION OF THE PREFERRED EMBODIMENT

Figure 3:
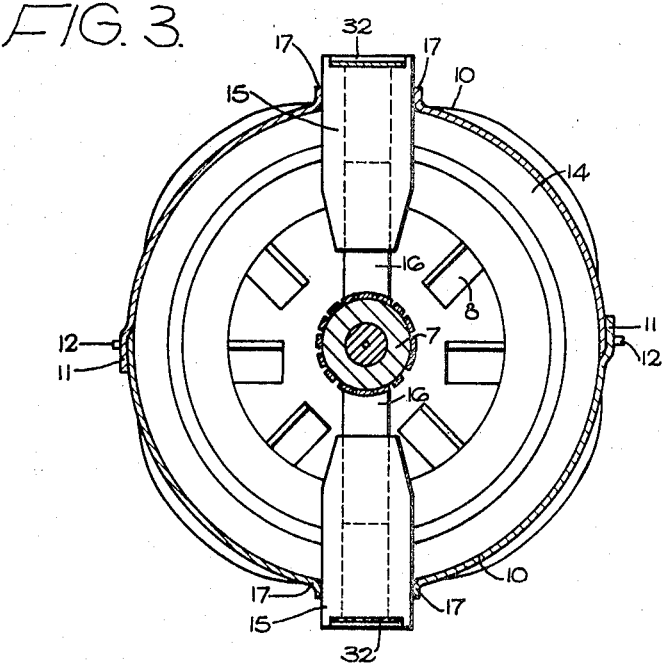
FIG. 3 is a section on the line 3—3 of FIG. 1.

The drawings show the application of the invention to the casing of an electric motor in a vacuum cleaner and in the sub-assembly shown, 6 is the rotor, 7 the commutator, 8 the cooling fan impeller, 9 the impeller of the vacuum cleaner exhaust fan and 9A the casing of the fan 9.

In the drawings, the two identical halves of the casing are shown at 10 and each half is made from a flat blank, initially of rectangular form, which is operated upon in a suitable press to form it to the substantially semi-cylindrical form shown in the drawings and at the same time, provide it with the various lugs, apertures and strengthening ribs hereinafter referred to.

Figure 4:
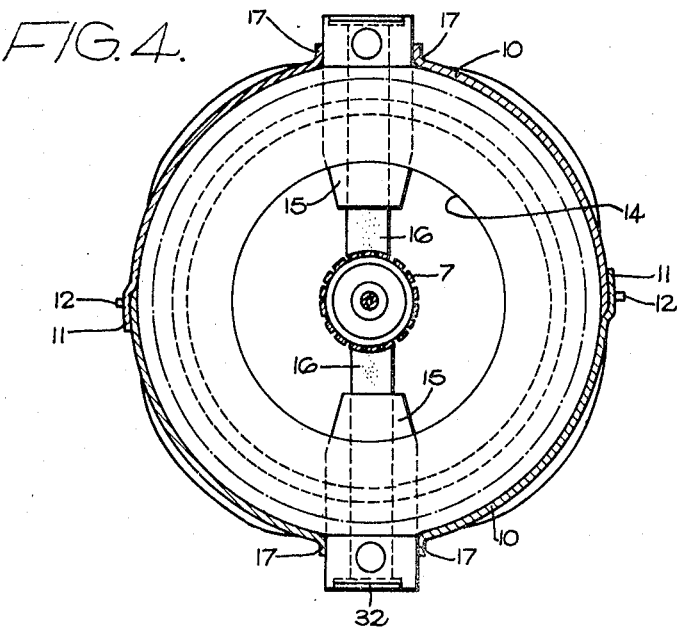
FIG. 4 is a section on the line 4—4 of FIG. 1 with the cooling fan impeller omitted.

It will be observed that one edge of each half 10 is cranked as indicated at 11 (in FIGS. 3 and 4) so that when the two halves are assembled together, these edges overlap to form a substantially cylindrical enclosure and also one edge of each half 10 is formed with a pair of radially outwardly projecting lugs 12 whilst the other edge of each pair is provided, in the appropriate position, with slots to receive the lugs 12 when the two parts are brought together so that by a simple manipulation, the lugs 12 can be passed through the appropriate slots and the substantially cylindrical casing then produced (as seen in FIGS. 3 and 4).

At this stage, as there is no very tight fit of the lugs 12 in their appropriate slots, the two parts 10 are not held together in strictly rigid relationship and thus it is possible to insert into this substantially cylindrical casing, a truly cylindrical and rigid member such as the stator 13 of the electric motor and this has the effect of stiffening up the two-part cylindrical casing so as to make it take a substantially true cylindrical form and force the lugs 12 into hard engagement with the edges of their slots so that once such interior cylindrical member has been inserted, the combination thereof with the two-part casing, forms a rigid structure and also imparts a substantially true cylindrical configuration to the two-part casing. Any further cylindrical member which is inserted into the casing will add further to the rigidity of the structure.

In the example shown in the drawings, a further cylindrical member which is inserted is a unitary assembly of brush holders mounted in a ring-like member shown at 14. This unitary assembly of brush holder, forms the subject of our copending application No. 792,864 filed Jan. 21, 1969.

The annular ring 14 forming the brush holder assembly is preferably formed as a moulding in a suitable plastics material having electrical insulating properties and, at diametrically opposite positions, the moulding is formed with brush housings indicated at 15, each of which has a radially extending passage in which is fitted a brush 16 which is spring pressed against the commutator 7.

Each half 10, of the casing has an open-ended slot cut therein and extending in the axial direction from one end of the casing. As seen in FIGS. 2, 3 and 4, each such slot, which is rectangular in shape, is defined by the outwardly turned lips 17 along the sides and the outwardly turned lips 18 at its inner closed end.

Also each housing 15 has an axially projecting part 19 which, together with the outer part of the housing 15, fits in one of the aforesaid slots in the casing. The complete assembly of the electric motor is fixed to the fan casing 9A by a number of tie rods 20 (only one of which is shown in FIG. 1) and these tie rods pass through holes in the lugs formed on the periphery of an end bearing plate 21 which fits into the one end of the casing 10, and further assists in maintaining the rigidity and cylindrical form of the two part casing. Each part 19 of the brush holder has an axially extending blind hole in which is a spring 22 bearing against the side wall of the fan casing 9A.

In assembly, the brush holder is inserted into the casing 10, 10 from the right hand end (FIG. 1) by sliding the housing 15 and parts 19 into the aforesaid slots in the casing.

Associated with each brush housing 15, in the slot in the casing, is a separate electrical terminal housing 23, also made as a moulding in suitable plastics material, and in the form of an open-ended rectangular frame with a rib 24 extending between its sides, each rib 24 having two projecting noses 25 which hook over the lips 18 on the casing to hold the terminal housing 23 in place in its slot in the housing. On the outer face of each rib 24 is fitted a metal terminal piece 26 with which electrical mains supply leads can be engaged and each terminal piece 26 also has a tag to connect to a lead 27 for the field windings of the stator.

Each brush 16 has a stem 28 around which is the spring 29 which acts on the brush and a metal spring strip 30 extends from the outer end of the stem 28 and has a leg 31 (see FIG. 2) making electrical contact with its associated terminal piece 26. A plate 32, of insulating material is secured to the part 19 of each housing 15 by a screw 33 and covers the outer end of the opening through the housing.

When forming the two parts 10 of the casing from the initial flat blanks, the slots which take the housings 15 of the brush holder are provided in a single pressing operation simultaneously with other apertures as shown at 34 for the cooling fan 8, the lugs 12 and their associated slots, and the lips 17 and 18. Also for strengthening purposes, ribs such as those shown at 35 and 36 and also 37 may be formed in the same operation upon the flat blanks forming the two parts 10, 10 of the casing.

The rib (or ribs) 36, extending axially also provides a means for locating the stator 13 in this end of the casing, such stator being provided with co-operating formations to engage the rib or ribs so that the stator is located angularly in the casing and also axially by the inner end of the rib 36 as can be seen in FIG. 1.

Thus, the present invention eliminates the costly and complicated operation as used hitherto in making up a cylindrical casing from a single metal blank and also reduces manufacturing costs as the assembly of the two parts of the casing and the insertion therein of the internal equipment, such as stator, brush holders, rotor etc. can be carried out without the necessity of highly skilled labour.

What I claim then is:

1. A casing for electrical equipment, comprising two mating, substantially semi-cylindrical casing halves assembled to form a substantially cylindrical casing, each casing half having two straight edges parallel to the axis thereof, a slot along one of the straight edges of each casing half and a radially outwardly projecting lug in the other straight edge of each casing half, the lug of one of said casing halves being engaged in the slot of the other casing half.

2. A casing according to claim 1, wherein the two casing halves are identical and each casing half has at least two of said slots and a corresponding number of said lugs.

3. A casing according to claim 1, wherein each casing half has circumferentially and axially extending reinforcing ribs, and a slot extending axially from one of its ends and shaped to receive a brush holder for the electrical equipment.

4. A casing according to claim 3, further comprising a cylindrical stator of an electric motor assembled therein, said stator having axially extending ribs on its exterior which engage within the said axial ribs in the two halves of the casing.

References Cited

UNITED STATES PATENTS

| | | | |
|---|---|---|---|
| 2,319,194 | 5/1943 | Youhouse | 310—50 |
| 2,752,514 | 6/1956 | Schwenden | 310—50 |
| 2,965,774 | 12/1960 | Rangus | 310—50 |
| 3,368,090 | 2/1968 | Miller | 310—50X |
| 3,443,132 | 5/1969 | Walker | 310—42 |
| 3,445,692 | 5/1969 | Kato | 310—42 |

W. E. RAY, Primary Examiner